June 19, 1934.  M. H. MARTIN  1,963,470
INBOARD TRUCK WITH SIDE BEARING MEANS
Filed July 12, 1928
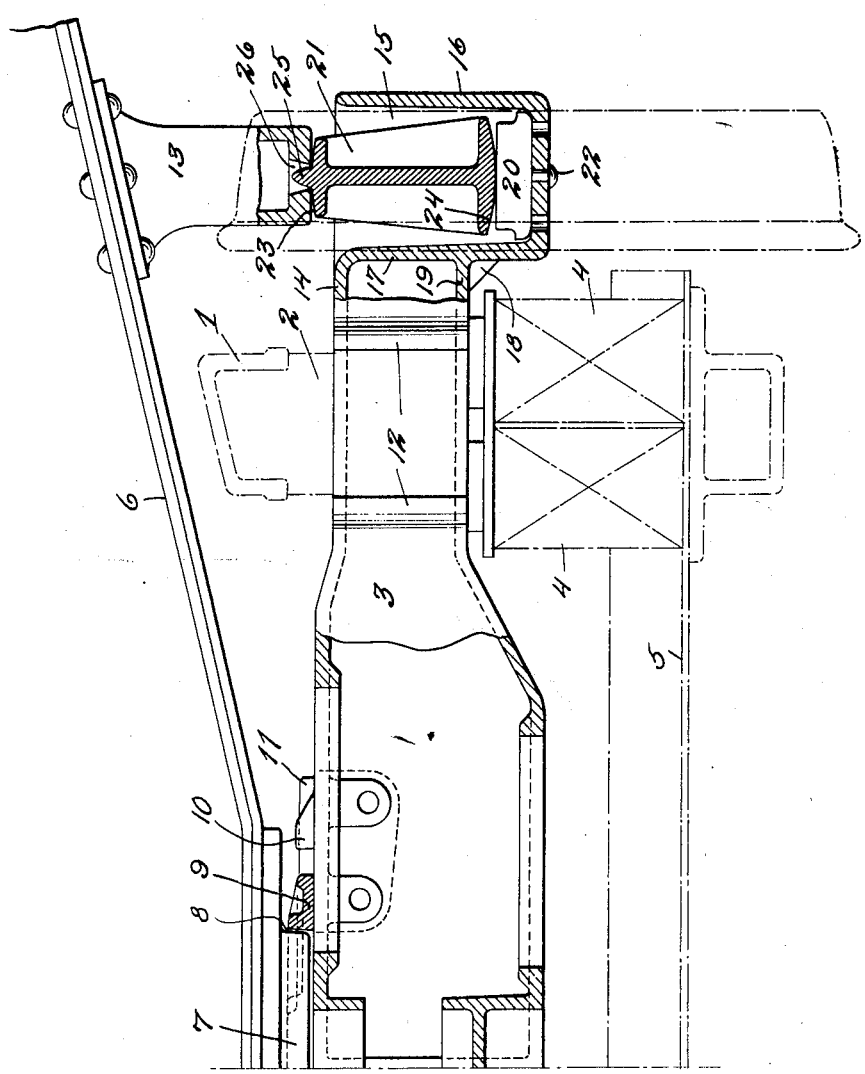

Patented June 19, 1934

1,963,470

UNITED STATES PATENT OFFICE 1,963,470

INBOARD TRUCK WITH SIDE BEARING MEANS

Mark H. Martin, Baltimore, Md., assignor to T. H. Symington & Son, Inc., Baltimore, Md., a corporation of Maryland Application July 12, 1928, Serial No. 292,266

6 Claims. (Cl. 105—201)

The invention relates to railway car trucks, particularly those of the inboard bearing type, that is to say in which the side frames are located inwardly of the wheels.

The principal object of the invention, generally stated, is to provide in a truck of this type a bolster equipped with side bearing means located outwardly of the side frames whereby the load will be supported at points far removed from the longitudinal center line of the car, thereby insuring great stability.

An important object of the invention is to provide a structure of this character in which the body bolster is capable of lateral motion with respect to the side frames, the side bearing means including rockers capable of universal movement so as to act properly and permit relative swivelling movement of the truck and body bolsters, or lateral motion of the body bolster, or a combination of both movements such as is bound to occur at certain times and under various conditions of car travel.

Another object of the invention is to provide a truck structure of this character which may embody various detailed features disclosed in certain co-pending applications which will be hereinafter referred to specifically, the various elements all combining and cooperating to insure not only free and easy movement but also the maintaining of the parts in their proper relation at all times.

Still another object of the invention is to provide a truck bolster and side bearing means which might conceivably be employed as a replacement part in a truck of the inboard bearing type without involving the making of any great changes in the construction thereof so that at least the major portion of existing equipment may be utilized to advantage while obtaining the benefits attendant upon the combination of the invention therewith.

Another object of the invention is to provide a truck bolster and side bearing assembly in which the bolster may be prolonged downwardly beyond the side frames to permit the employment of side bearing rockers of greater length or height than would otherwise be possible, it being a feature that removable and shimmable bearing elements be located beneath the rockers for the purpose of adjusting them with respect to the coacting bearing elements which depend from the body bolster.

An additional object of the invention is to provide an arrangement and structure of this character which will be comparatively simple and inexpensive to manufacture, easy to assemble and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

The figure is a vertical longitudinal section through one side portion of a truck constructed in accordance with the invention, the side frame and associated parts being shown by broken lines, and a portion of the truck and the body bolster being shown in elevation.

Referring more particularly to the drawing, I have disclosed a truck, or portion thereof, of the inboard bearing type in which the side frames 1 are located inwardly of the wheels, not shown. Each side frame is formed with the usual window opening 2 which receives the end portion of the truck bolster which is designated generally by the numeral 3 and which is supported upon truck springs 4 carried by a spring plank 5 mounted within the lower portion of the side frame as is customary.

The body bolster is indicated at 6 and may be of any preferred specific construction inasmuch as the details thereof are immaterial. Depending from the center of the body bolster and secured thereto in any desired manner is a center plate 7 preferably engaged within a circular opening 8 in a block-like casting member 9 slidable upon the top of the truck bolster 3, the movement being limited by one or more abutments 10 on the latter. Guides 11 are provided preferably at the sides of the truck bolster so as to restrain the slidable member 9 against displacement laterally of the truck bolster. It is conceivable that the details in this respect may be very similar to what is disclosed in my co-pending application Serial No. 226,446, filed October 15th, 1927, though it may be just as convenient to make use of the structure shown in the co-pending application of Thomas H. Symington, Serial No. 181,161, filed April 5th, 1927. Both of said co-pending applications show a casting member rotatably receiving the center plate on the body bolster and slidable longitudinally along the truck bolster. Regardless of what the detailed construction may be it is intended that the body bolster 6 be capable of movement laterally with respect to the side frames while the truck bolster 3 is held against such movement by means of 110 one or more of the usual ribs 12 which embrace the edges of the pedestal guides or sides of the window opening in the side frame.

Depending from each end portion of the body bolster and secured thereto in any suitable manner, either as by the rivets shown or by the means illustrated in my co-pending application Serial No. 283,382, filed June 6th, 1928, is a side bearing element 13 designed to cooperate with the side bearing means, to be described, carried by the truck bolster.

In accordance with the present invention the truck bolster is of sufficient length that the ends thereof project beyond the side frames as clearly illustrated, and these projecting ends, indicated at 14, are formed with pockets 15 which preferably, though not necessarily, have their bottoms located below the portions of the truck bolster seating upon the springs. By this particular construction it is apparent that the pockets will be of sufficient depth to accommodate side bearing rockers of greater length or height than would otherwise be possible. In the present instance the pocket is shown as defined between the outer end wall 16 and an intermediate end wall 17, a diagonal web 18 being preferably provided at the corner where the lower portion of the wall 17 joins the bottom wall 19 of the bolster, this web being for reinforcing purposes to strengthen the angle. Located within the bottom of the pocket 15 is a bearing member 20 which forms a support for the side bearing rocker 21. The bearing member 20 may be secured as by a rivet 22 or it may, if preferred, simply fit removably within the bottom of the pocket. The rocker 20 of course cooperates with the bearing element 13 which depends from the body bolster and it is intended that it have at least substantially universal movement so as to accommodate itself to relative swivelling movements of the truck and body bolsters and also lateral motion of the latter while always remaining in proper relation to the parts. Such being the case, it is intended that the top and bottom surfaces 23 and 24, respectively, of the rocker be at least substantially, if not entirely, spherical. To prevent relative displacement of the parts the upper end of the rocker is provided with a spud 25 received within an opening 26 in the lower end of the depending bearing element 13. Actually, the rocker may be constructed in the manner shown in the co-pending application of Thomas H. Symington, Serial No. 177,287, filed March 22nd, 1927, or as shown in the co-pending application of Percy R. Drenning, Serial No. 177,340, filed March 22nd, 1927. In order to stabilize the parts so that there will normally be a tendency for them to remain in neutral position, flat spots may be provided at the top or bottom, or both, of the rocker as shown in the last mentioned co-pending application. These and other details may be changed without in any way departing from the spirit of the invention.

Assuming that the structure has been made and assembled as described and illustrated, it will be apparent that under normal circumstances the body bolster, side bearing rockers and slidable bearing member 9 will remain in neutral position. Upon the occurrence of relative swivelling movement of the truck and body bolsters, as for example when passing over curved track, the center plate 7 will pivot within the opening 8 and the rockers 21 will move upon the bearing members 20 and with respect to the depending bearing elements 13 so that there will be no binding of the parts at any time. In case the wheels of the car pass over a low spot in a rail and under other circumstances when there is any tendency for the car body to move laterally with respect to the track, the body bolster 6 will move laterally with respect to the truck side frames. At such a time the rockers 21 will of course rock in a direction longitudinally of the truck bolster and the member 9 will slide longitudinally until it is brought to a stop by engagement with either of the abutments 10. It is intended that the rockers 21 have their upper and lower surfaces of such curvature, for instance as illustrated in said co-pending applications, that upon the occurrence of lateral motion there will be a lifting tendency so that gravity will work against the lateral force and practically if not entirely neutralize it, thereby eliminating sudden shocks and jars which would otherwise come upon the side frames, wheel flanges and other parts of the truck. The strains and stresses are consequently materially reduced so that the entire mechanism will possess a long life. Inasmuch as the pockets and side bearing rockers are located at substantially the maximum distance from the center line of the car it is apparent that there will be unusual stability especially as the lifting effect upon the occurrence of lateral motion will tend to check the development of car roll or side sway. It will be seen that in every way the device is bound to be a distinct improvement and to possess material advantages which will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck, the combination of side frames, a truck bolster having its ends extending through and projecting beyond the side frames, the projecting ends being formed with integral portions defining pockets of greater depth than the adjacent portions of the bolster, a side bearing rocker within each pocket, a body bolster, means connecting the body bolster with the truck bolster whereby there may be relative swivelling movement of the bolsters and lateral motion of the body bolster with respect to the side frames, and bearing elements depending from the body bolster and engaging upon said rockers.

2. In combination, a truck bolster and a body bolster having a slidable pivotal connection, side frames through and beyond which the ends of the truck bolster project, side bearing rockers mounted and substantially enclosed within the projecting ends, and bearing elements depending from the body bolster and cooperating with said rockers.

3. In an inboard bearing truck having side frames, the combination of a truck bolster having its ends projecting through and beyond the side frames, the ends being formed outwardly of the side frames with pockets defined by an end wall and an intermediate transverse wall spaced therefrom, side bearing rockers within the pockets, a body bolster, and bearing elements depending from the body bolster and coacting with said rockers.

4. In an inboard bearing truck having side frames, the combination of a truck bolster having its ends projecting through and beyond the side frames, the ends being formed outwardly of the side frames with pockets defined by an end wall and an intermediate transverse wall spaced therefrom, side bearing rockers within the pockets, a body bolster, and bearing elements depending from the body bolster and coacting with said rockers, the pockets having their bottoms prolonged downwardly beyond the level of the engagement of the truck bolster upon the truck springs so as to permit the employment of elongated rockers.

5. In an inboard bearing truck having side frames, the combination of a truck bolster having its ends projecting through and beyond the side frames, the ends being formed outwardly of the side frames with pockets defined by an end wall and an intermediate transverse wall spaced therefrom, side bearing rockers within the pockets, a body bolster, bearing elements depending from the body bolster and coacting with said rockers, the end and transverse walls being prolonged downwardly beyond the truck spring engaging portion of the truck bolster, and a bearing member within the pocket beneath the rocker therein.

6. In an inboard bearing truck having side frames, the combination of a truck bolster having its ends projecting through and beyond the side frames, the ends being formed outwardly of the side frames with pockets defined by an end wall and an intermediate transverse wall spaced therefrom, side bearing rockers within the pockets, a body bolster, bearing elements depending from the body bolster and coacting with said rockers, the end and transverse walls being prolonged downwardly beyond the truck spring engaging portion of the truck bolster, a bearing member within the pocket beneath the rocker therein, and a reinforcing web at the juncture of the spring engaging portion of the truck bolster with the transverse wall of each pocket.

MARK H. MARTIN.